(12) United States Patent
Fukase

(10) Patent No.: US 7,614,320 B2
(45) Date of Patent: Nov. 10, 2009

(54) BRAKE PEDAL APPARATUS

(75) Inventor: Akihiko Fukase, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 172 days.

(21) Appl. No.: 11/120,282

(22) Filed: May 3, 2005

(65) Prior Publication Data

US 2006/0230870 A1 Oct. 19, 2006

(30) Foreign Application Priority Data

Apr. 12, 2005 (JP) ............................ 2005-114994

(51) Int. Cl.
*G05G 1/14* (2006.01)
(52) U.S. Cl. .............................. 74/512; 74/516; 74/518
(58) Field of Classification Search .................. 74/512, 74/516, 518, 560; *G05G 1/14*
See application file for complete search history.

(56) References Cited

U.S. PATENT DOCUMENTS

| | | | |
|---|---|---|---|
| 3,063,427 A | 11/1962 | Hill | |
| 3,988,945 A | 11/1976 | Fasano | |
| 4,005,617 A | 2/1977 | Sorbel et al. | |
| 4,615,235 A * | 10/1986 | Horvath | 74/516 |
| 5,010,782 A * | 4/1991 | Asano et al. | 74/512 |
| 5,161,657 A | 11/1992 | Papenhagen | |
| 5,848,558 A * | 12/1998 | Isono et al. | 74/512 |
| 5,996,440 A * | 12/1999 | Nawata et al. | 74/512 |
| 6,666,105 B2 | 12/2003 | Wachi | |
| 7,017,441 B2 * | 3/2006 | Hayashihara et al. | 74/512 |
| 7,047,837 B2 * | 5/2006 | Hayashihara | 74/512 |
| 7,069,810 B2 * | 7/2006 | Hayashihara | 74/512 |
| 7,219,576 B2 * | 5/2007 | Leonard et al. | 74/518 |
| 7,228,759 B2 * | 6/2007 | Jagger et al. | 74/512 |
| 7,421,927 B2 * | 9/2008 | Terradas et al. | 74/512 |
| 2005/0204855 A1 | 9/2005 | Fujiwara et al. | |
| 2007/0277640 A1 * | 12/2007 | Fukase | 74/516 |
| 2008/0223171 A1 * | 9/2008 | Fujiwara et al. | 74/512 |

FOREIGN PATENT DOCUMENTS

JP  2000-127926 A  9/1976

(Continued)

*Primary Examiner*—Vinh T. Luong
(74) *Attorney, Agent, or Firm*—Finnegan, Henderson, Farabow, Garrett & Dunner, LLP

(57) ABSTRACT

A brake pedal apparatus includes: an operating pedal to be depressed so as to be pivoted about a first axis; a pivot member pivotable about a second axis parallel to the first axis, and connected to the operating pedal via a connecting link so as to be pivoted about the second axis in response to a depression of the operating pedal; and an output member to receive an output generated upon pivot motion of the pivot member. The connecting link is connected, at respective connected positions, to the operating pedal and the pivot member. A relationship between a ratio of the output to a depression force acting on the operating pedal, and an amount of the depression of the operating pedal is changed depending upon the connected positions of the connecting link. The brake pedal apparatus further includes a ratio characteristic changing device operable, when the depression force exceeds a predetermined value, to shift at least one of the connected positions of the connecting link, for changing the relationship between the ratio and the amount of the depression of the operating pedal.

7 Claims, 5 Drawing Sheets

FOREIGN PATENT DOCUMENTS

| | | |
|---|---|---|
| JP | S51-31340 B | 9/1976 |
| JP | 05-185912 | 7/1993 |
| JP | 05-301565 | 11/1993 |
| JP | 07-205776 | 8/1995 |
| JP | 2002-347590 A | 12/2002 |
| WO | WO 00/48881 | 8/2000 |
| WO | WO 02/055353 A2 | 7/2002 |

* cited by examiner

BRAKE PEDAL APPARATUS

BACKGROUND OF THE INVENTION

1. Field of the Invention

The present invention relates in general to a brake pedal apparatus, and more particularly to an improvement of a brake pedal apparatus in which a characteristic of a lever ratio is changed depending upon a depression force.

2. Discussion of Prior Art

There is known a brake pedal apparatus having (a) an operating pedal which is disposed pivotably about a first axis, (b) a pivot member which is disposed pivotably about a second axis parallel to the first axis, and which is connected to the operating pedal via a connecting link so as to be mechanically pivoted about the second axis in response to a depressing operation effected on the operating pedal; and (c) an output member which is to be mechanically pressed or pulled as a result of pivot motion of the pivot member. As an example of such a brake pedal apparatus, Patent Document 1 discloses an apparatus in which a lever ratio representative of a ratio of an output to a depression force acting on the operating pedal is changed in accordance with a pedal stroke, and a lever ratio characteristic, i.e., a characteristic of the lever ratio in relation with change of the pedal stroke is dependent on connected positions of the connecting link.

Meanwhile, Patent Document 2 discloses an apparatus in which the output member (push rod) is connected directly to the operating pedal. When a depression force exceeds a predetermined value, a connected position at which the output member is connected to the operating pedal is changed against a biasing force of a spring, such that a lever ratio is increased. That is, a larger braking force can be generated when a large depression force is applied, for example, in the event of emergency braking.

Patent Document 1: JP-H7-205776A
Patent Document 2: JP-H5-301565A

However, in Patent Document 1, the lever ratio is changed merely in accordance with the constant lever ratio characteristic which is dependent on the connected positions of the connecting link. Therefore, when the brake pedal apparatus is operated with application of a large depression force thereto for quickly obtaining a large braking force, for example, it is not necessarily possible to obtain a braking force and a braking operation feeling corresponding to a braking command given by a vehicle driver. In Patent Document 2, it is possible to obtain an improved braking operation feeling owing to the arrangement in which the lever ratio characteristic is changed in accordance with the depression force exerted by a vehicle driver. In Patent Document 2, however, the change of the connected position, at which the output member is connected to the operating pedal, results in a change of posture (angle) of the output member, thereby providing a limitation in amount of possible displacement of the connected position and consequently making it difficult to largely change the lever ratio characteristic. Further, in Patent Document 2, the connected position is directly biased by a spring, which is required to generate a large spring force and accordingly has to be large in size and high in cost.

The present invention was made in the light of the background art discussed above. It is therefore an object of the invention to make it possible to make a brake pedal apparatus compact in size at a reduced cost, which apparatus is capable of providing a satisfactory braking operation feeling by largely changing its lever ratio characteristic in accordance with a braking command (depression force) given by a vehicle driver.

SUMMARY OF THE INVENTION

For achieving the above object, the first invention provides a brake pedal apparatus having: (a) an operating pedal which is disposed pivotably about a first axis; (b) a pivot member which is disposed pivotably about a second axis parallel to the first axis, and which is connected to the operating pedal via a connecting link so as to be mechanically pivoted about the second axis in response to a depressing operation effected on the operating pedal; and (c) an output member which is to be mechanically pressed or pulled as a result of pivot motion of the pivot member, wherein (d) a characteristic of a lever ratio representative of a ratio of an output to a depression force acting on the operating pedal, in relation with change in a pedal stroke, is dependent on connected positions of the connecting link, the brake pedal apparatus is characterized by being provided with (e) a lever-ratio characteristic changing device which changes the characteristic of the lever ratio, by shifting one of the connected positions of the connecting link, when the depression force exceeds a predetermined value.

The second invention is, in the brake pedal apparatus of the first invention, characterized in that the lever-ratio characteristic changing device shifts the one of the connected positions of the connecting link such that the lever ratio is increased, when the depression force exceeds the predetermined value.

The third invention is, in the brake pedal apparatus of the first or second invention, characterized in that the lever-ratio characteristic changing device is equipped with: (a) a control lever which is disposed on a connected-position varying member connected to the connecting link at a variable position, pivotably about a third axis parallel to the first axis, and which is connected to the connecting link, the control lever being pivoted about the third axis so as to shift the one of the connected positions of the connecting link, for changing the characteristic of the lever ratio; and (b) a pivoting device extending between the connected-position varying member and an engaging portion of the control lever which is disposed to be distant from the one of the connected positions of the connecting link by a distance larger than a distance between the one of the connected positions and the third axis, the pivoting device holding the control lever in a fixed reference position about the third axis when the depression force does not exceed the predetermined value, while causing the control lever to be pivoted away from the reference position so as to shift the one of the connected positions when the depression force exceeds the predetermined value.

The fourth invention is, in the brake pedal apparatus of the third invention, characterized in that the pivoting device is equipped with: (a) a load sensor which is disposed in a transmission path along which the depression force is to be transmitted, so as to detect a transmitted load; and (b) an electric driving device which is connected to the engaging portion of the control lever, the electric driving device holding the control lever in the reference position when the transmitted load does not exceed a threshold corresponding to the predetermined value, while causing the control lever to be pivoted about the third axis when the transmitted load exceeds the threshold.

The fifth invention is, in the brake pedal apparatus of the third invention, characterized in that the pivoting device is an elastic member biasing the control lever in a first direction about the third axis so as to force the control lever against a reference stopper which defines the reference position, while mechanically allowing the control lever to be pivoted based on the depression force, away from the reference position in a direction opposite to the first direction when the depression force exceeds the predetermined value.

In the brake pedal apparatus constructed as described above in which one of the connected positions of the connecting link is adapted to changeable, the one of the connected positions is shifted when the depression force exceeds the predetermined value, whereby the lever ratio characteristic is changed. This arrangement makes it possible to provide a further satisfactory braking operation feeling corresponding to a depression force. Further, this arrangement permits the connected position to be shifted with a higher degree of freedom than in an arrangement in which the connected position of the output member is shifted, because of absence of limitation arising from change of posture of the output member. The higher degree of freedom as to shift of the connected position enables the lever ratio characteristic to be greatly changed in accordance with a braking command (depression force) given by a vehicle driver.

In the third invention, the lever-ratio characteristic changing device is constructed to be equipped with the control lever and the pivoting device, wherein the control lever can be held in the reference position by a relatively small force of the pivoting device corresponding to the lever ratio of the control lever (a ratio between a length of moment arm of force acting on the connected position and a length of moment arm of force acting on the engaging portion). This arrangement permits the lever-ratio characteristic changing device including the pivoting device, to be made compact in size at a reduced cost.

In the fourth invention, the electric driving device is used in the pivoting device, so that the control lever is arranged to be electrically pivotable. This arrangement facilitates determination of a value (predetermined value) of the depression force at which the lever ratio characteristic is to be changed, thereby permitting the value to be freely determined in relation to, for example, type of vehicle. Further, in this arrangement, the lever ratio characteristic may be changed in a single step when the depression force reaches the predetermined value, or alternatively may be changed gradually or in a plurality of steps in accordance with the depression force. That is, it is possible to freely determine a changing manner according to which the lever ratio characteristic is to be changed. Further, it is also possible to select, in relation to a vehicle condition, a suitable mode according to which the predetermined value and the changing mode are to be changed.

In the fifth invention, the pivoting device is constituted by an elastic member, such that the control lever is held by the biasing force of the elastic member, in the reference position, and such that the control lever is mechanically allowed to be pivoted away from the reference position against the biasing force of the elastic member when the depression force exceeds the predetermined value. In this arrangement, the lever ratio characteristic is gradually changed owing to continuous change of the biasing force as a result of an elastic deformation of the elastic member. Further, the apparatus can be constructed easier and cheaper, eliminating necessity of a complicated control, as compared with an arrangement in which the control lever is arranged to be pivoted by using the electric driving device.

The connecting link is provided by, for example, by a single link member extending between the operating pedal and the pivot member and connecting therebetween. The connected-position varying member is provided by the operating pedal or the pivot member. However, the connecting link may be provided by a plurality of link members which are connected in series. In this case, the connected-position varying member may be provided by one of the link members in place of the operating pedal and the pivot member.

The output member is provided by, for example, by a rod of a brake booster which is to be pressed in response to a depressing operation effected on the operating pedal. However, the output member may be provided by a brake cable which is to be pulled in response to the depressing operation. Further, the present invention is applicable also to an electric brake system in which a braking force is controlled by electrically detecting load applied to the output member and displacement of the output member.

In the second invention, when the depression force exceeds the predetermined value, the connected position is shifted such that the lever ratio is increased, whereby a larger braking force is obtained by the same depression force. However, for preventing overadjusting in a brake system equipped with an automatic shoe clearance adjusting device, or preventing slipping due to an excessively large braking force which could be generated in snow mode, for example, the connected position may be shifted in a manner reducing the lever ratio when the depression force exceeds the predetermined value.

In the third invention, the lever-ratio characteristic changing device is constructed to be equipped with the control lever and the pivoting device, wherein the pivoting device is arranged such that the control lever can be held in the reference position by a relatively small force of the pivoting device corresponding to the lever ratio of the control lever. However, each of the first and second invention may be carried out with any one of various arrangements such as an arrangement in which the connected position of the connecting link is positioned or moved directly by an elastic member or an electric driving device.

The lever-ratio characteristic changing device is constructed, for example, to position the control lever in a selected one of two positions, i.e., the above-described reference position and a lever-ratio changing position. The control lever is preferably arranged, when the depression force exceeds the predetermined value, to be smoothly pivoted toward the lever-ratio changing position as a result of the increase of the depression force and eventually positioned in a pivot end. The control lever may be arranged to be quickly pivoted to the lever-ratio changing position as soon as the depression force exceeds the predetermined value, or alternatively may be arranged such that an amount of the pivot motion is gradually increased until the depression force considerably exceeds the predetermined value. The manner of the pivot motion of the control lever may be thus suitably changed as needed. The same thing can be said about a case in which the connected position of the connecting link is directly shifted.

The electric driving device of the forth invention may take any one of various arrangements such as an arrangement in which a nut disposed in the control lever is linearly moved by a feed screw rotated by an electric motor, an arrangement in which the control lever is pivoted by rack and pinion or gear unit activated by an electric motor, an arrangement in which the control lever is pivoted by a hydraulic actuator such as hydraulic cylinder activated by establishing a selected oil passage by selectively opening and closing an electromagnetic valve, and an arrangement in which the control lever is pivoted by an output rod moved forward or reverse by an electromagnetic force. The load sensor may be provided by any one of various known sensors such as a road cell and a strain gauge, or may be provided by an ON-OFF switch in which a signal is turned ON or OFF with application of a predetermined load thereto.

The elastic member of the fifth invention may be provided by any one of various elastic members such as a spring member (e.g., compression coil spring, tensile coil spring, torsion coil spring, plate spring, torsion spring), an air spring and a rubber block. Further, a plurality of elastic members may be used for changing the amount of pivot motion of the control lever that is the connected position of the connecting link in a plurality of steps in accordance with the depression force.

The reference stopper of the fifth invention may take any one of various forms. For example, the fifth invention may be carried out with an arrangement in which an elongated hole is formed in the connected-position varying member so as to extend along an arc whose center lies at the third axis while the connecting pin connecting the connecting link to the control lever is arranged to pass through the elongated hole. The connecting pin is held in contact with an end portion of the elongated hole which functions as a reference stopper, whereby the control lever is positioned in the reference position. In this arrangement, the other end portion of the elongated hole may be arranged to function as a lever-ratio change stopper which defines the above-described lever-ratio changing position. The elongated hole does not necessarily have to have an arcuate shape but may have other shape such as a rectangular shape, as long as the elongated hole is shaped to allow the pivot motion of the connecting pin about the third axis. Further, a stopper pin or the like may be provided in addition to the connecting pin.

Either of the fourth and fifth invention may be carried out together with the third invention. The presence of the control lever allows use of the electric driving device or the elastic member capable of generating a small force. However, the control lever may be replaced with other booster device, such as a toggle mechanism and a combination of large and small gears, which is used together with the similar electric driving device or elastic member, for changing the lever ratio characteristic.

It is common that the lever ratio characteristic is adapted such that the lever ratio is changed in accordance with the pedal stroke. However, the connecting link may be disposed in a manner forming a parallelogram link, for establishing a lever ratio characteristic permitting the lever ratio to be held substantially constant as in an arrangement in which the output member is connected directly to the operating pedal.

BRIEF DESCRIPTION OF THE DRAWINGS

FIG. 2b is a cross sectional view showing in enlargement the lever-ratio characteristic changing device of the embodiment of FIG. 1, taken along line 2B-2B of FIG. 2a.

DETAILED DESCRIPTION OF THE INVENTION

There will be described in detail embodiments of the present invention, with reference to the drawings.

Figure 1:
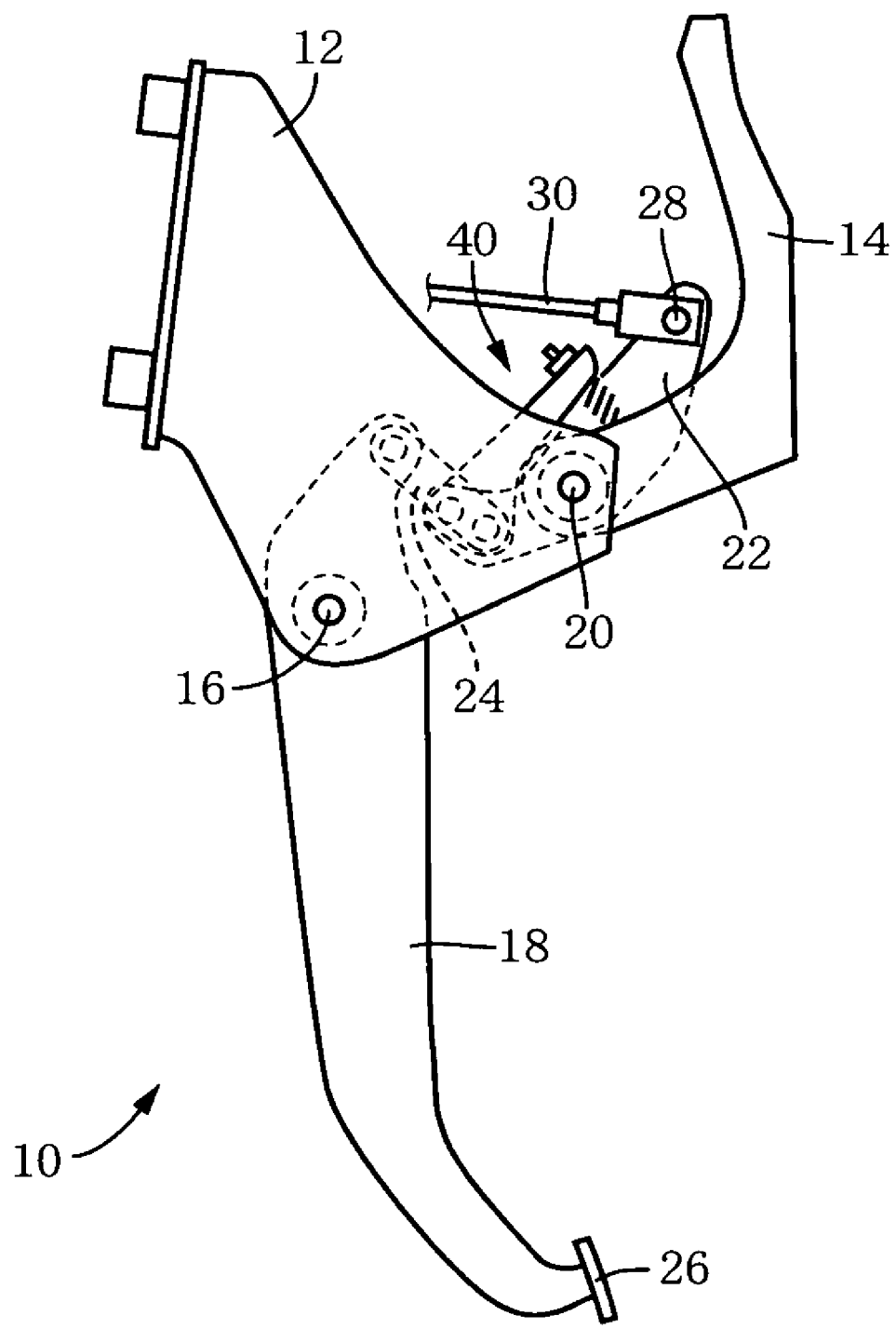
FIG. 1 is a front view schematically showing a brake pedal apparatus to which the present invention is applied.

FIG. 1 is a front view schematically showing an embodiment of the invention in the form of a brake pedal apparatus 10 which is to be used for a service braking system of a vehicle. This brake pedal apparatus 10 is provided in brackets 12, 14 which are integrally fixed to a body of the vehicle. An operating pedal 18 is provided in the bracket 12, so as to be pivotable about an axis of a first support shaft 16 which is substantially horizontal. The brackets 12, 14 are connected through a second support shaft 20 on which a pivot member 22 is mounted to be pivotable about an axis of the second support shaft 20. A connecting link 24 is provided to extend between the operating pedal 18 and the pivot member 22. The first and second support shafts 16, 20 are held in parallel to each other, and the axes of the first and second support shafts 16, 20 correspond to a first axis and a second axis, respectively.

The operating pedal 18, when a pedal pad 26 provided in its lower end portion is depressed by a driver of the vehicle, is pivoted clockwise about the first support shaft 16 as seen in FIG. 1, thereby causing the pivot member 22 to be mechanically pivoted counterclockwise about the second support shaft 20, through the connecting link 24 which is connected to an upper end portion of the operating pedal 18. A rod 30 is connected to an upper end portion of the pivot member 22, so as to be pivotable relative to the pivot member 22 about an axis of a connecting pin 28 which is parallel to the second support shaft 20. As a result of the pivot motion of the pivot member 22, the rod 30 is mechanically pressed leftward as seen in FIG. 1, and pushes a push rod of a master cylinder (not shown), for generating a hydraulic brake pressure. The rod 30 is biased to project outwardly of the brake booster. Therefore, when the pedal pad 26 is released from the depressing operation effected thereon, the biasing force of the rod 30 causes the pivot member 22 to be pivoted back clockwise about the second support shaft 20, and the operating pedal 18 to be pivoted back counterclockwise about the first support shaft 16 so as to be brought into its original position as shown in FIG. 1. It is noted that the rod 30 corresponds to an output member.

Figure 3:
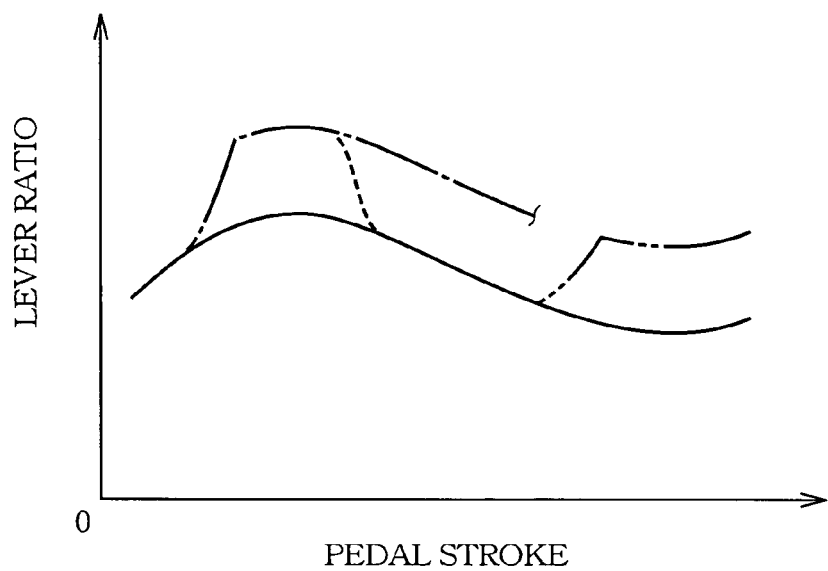
FIG. 3 is a view explaining a lever ratio characteristic of the embodiment of FIG. 1.

In the brake pedal apparatus 10 as described above, a lever ratio representative of a ratio of an output acting on the rod 30, to a depression force (input) exerted onto the operating pedal 18 is continuously changed based on a pedal stroke (amount of depression of the operating pedal 18) according to a reference pattern (reference characteristic of the lever ratio) which is indicated by solid line in FIG. 3. The output relative to the input (depression force) is increased with an increase of the lever ratio. With the lever ratio being gradually changed in accordance with the pedal stroke, the vehicle driver is given an excellent feeling during a braking operation, since a resistance (rigid feeling) to depression of the operating pedal 18 and a braking force are changed with a satisfactory balance therebetween. The reference pattern can be suitably determined, for example, by adjusting a length of the connecting link 24 and a connected position of the connecting link 24.

Figure 2A:
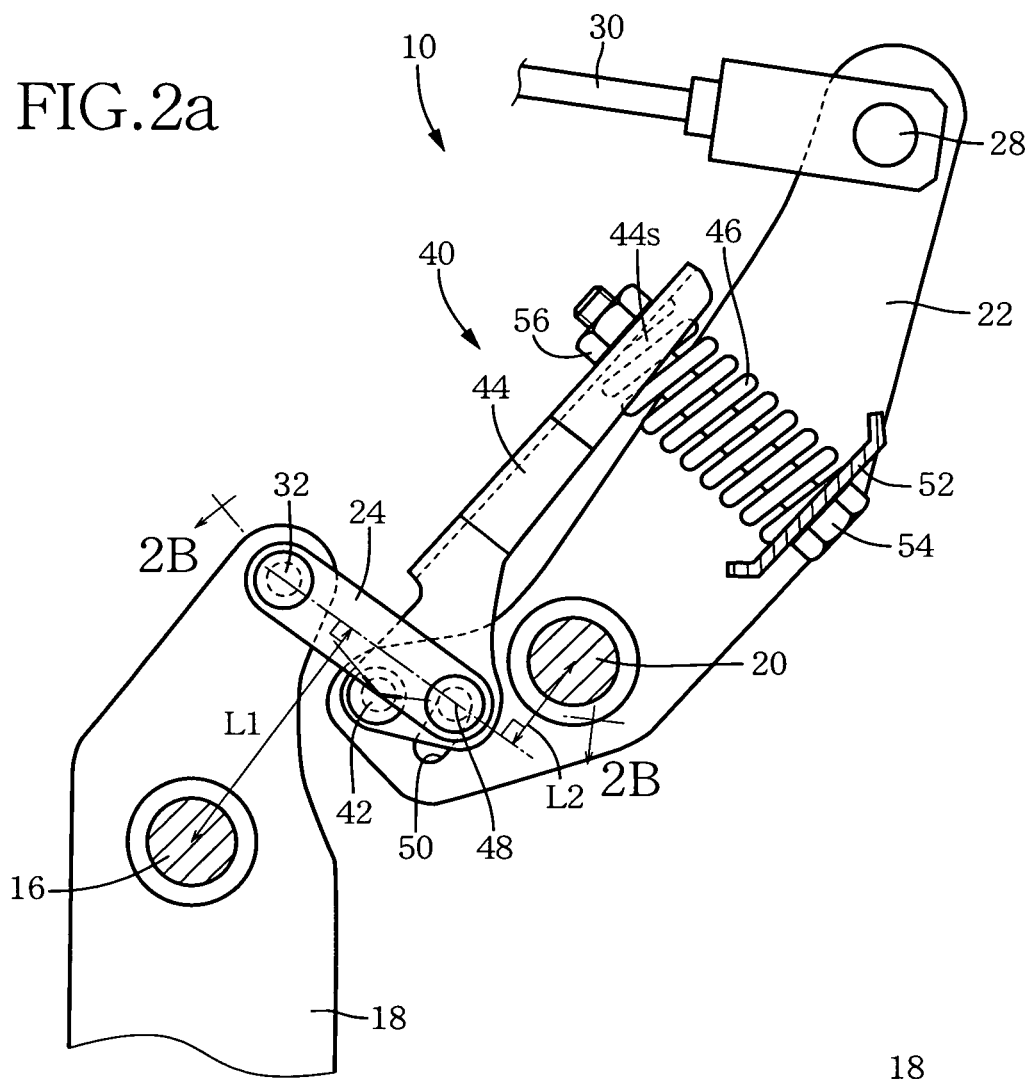
FIG. 2a is a front view showing in enlargement a lever-ratio characteristic changing device of an embodiment of FIG. 1, without brackets being illustrated.
Figure 2B:
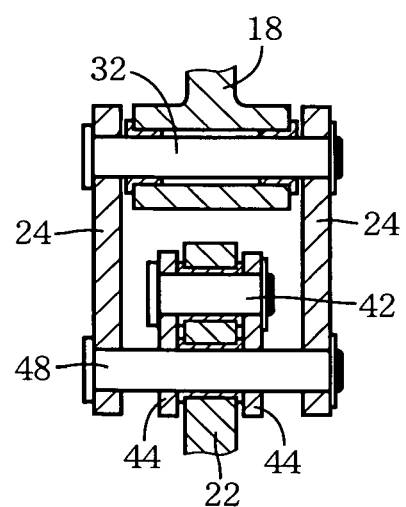

In the present embodiment, meanwhile, as shown in FIGS. 2a, 2b, the connecting link 24 is connected at one of its opposite end portions to the upper end portion of the operating pedal 18 through a connecting pin 32 which is parallel to the first support shaft 16, such that the connecting link 24 and the operating pedal 18 are pivotable about the connecting pin 32 relative to each other. The connecting link 24 is connected at the other of its opposite end portions to the pivot member 22 through a lever-ratio characteristic changing device 40, so that the lever ratio characteristic is changed with shift of the connected position of the connecting link 24 which shift is caused in accordance with the depression force. FIG. 2a is an enlarged front view without the above-described brackets 12, 14 being illustrated, while FIG. 2b is a cross sectional view taken along line 2B-2B of FIG. 2a. The lever-ratio characteristic changing device 40 is equipped with a control lever 44 and a compression coil spring 46. The control lever 44 is provided to be connected to the lower end portion of the pivot member 22 through a support pin 42 which is parallel to the second support shaft 20, such that the control lever 44 and the pivot member 22 are pivotable about the support pin 42 relative to each other. The compression coil spring 46 is provided to extend between the control lever 44 and the pivot member 22. In the present embodiment, the pivot member 22 corresponds to a connected-position varying member. The axis of the support pin 42 corresponds to a third axis. The compression coil spring 46 corresponds to an elastic member functioning as a pivoting device.

The connecting link 24 is connected to the control lever 44 through a connecting pin 48 which is located in vicinity of the support pin 42 and is parallel to the support pin 42, such that the connecting link 24 and the control lever 44 are pivotable about the connecting pin 48 relative to each other. The connecting pin 48 is arranged to pass through an elongated hole 50 which is formed through the pivot member 22 and which extends along an arc whose center corresponds to the support pin 42. The connecting pin 48 is thus engaged to the elongated hole 50 thereby defining a range within which the control lever 44 is pivotable and also defining a range within which the connecting pin 48 as the connected position of the connecting link 24 is movable for changing the lever ratio characteristic. The control lever 44 extends upwardly along the pivot member 22, and is engaged at its distal end portion, i.e., at its engaging portion 44s to the compression coil spring 46. The engaging portion 44s of the control lever 44 is distant from the support pin 42 by a distance which is sufficiently larger than a spacing distance between the connecting pin 48 and the support pin 42. Owing to a biasing force of the compression coil spring 46, the control lever 44 is held in a state in which the lever 44 is substantially integrally fixed to the pivot member 22, so that the connecting pin 48 connecting the connecting link 24 to the control lever 44 substantially functions as the connected position at which the connecting link 24 is connected to the pivot member 22.

The compression coil spring 46 is disposed between the engaging portion 44s and a spring receiver 52 which is integrally fixed to the pivot member 22 by, for example, welding. The compression coil spring 46 disposed between the engaging portion 44s and the spring receiver 52 is held compressed and deformed, whereby the control lever 44 is biased by the biasing force generated by the compressive deformation of the spring 46, in a first direction corresponding to the counterclockwise direction about the support pin 42 as seen in FIG. 2a, so that the control lever 44 is positioned and held in a reference position in which the pin 48 is in contact with one of opposite end portions of the elongated hole 50, as shown in FIG. 2a. In a normal pedaling operation in which the depression force exerted onto the operating pedal 18 is not larger than a predetermined value, the control lever 44 is held in the reference position owing to the biasing force of the compression coil spring 46, and the lever ratio is gradually changed according to the reference pattern indicated by the solid line of FIG. 3. The above-described one of the opposite end portions of the elongated hole 50 corresponds to a reference stopper which defines the reference position of the control lever 44.

On the other hand, when the depression force exerted onto the operating pedal 18 exceeds the above-described predetermined value, the control lever 44 is pivoted relative to the pivot member 22 about the support pin 42 in the clockwise direction as seen in FIG. 2a, against the biasing force of the compression coil spring 46. The clockwise pivot motion of the control lever 44 causes the position of the connecting pin 48 to be moved in a direction away from the second support shaft 20, thereby reducing a ratio (L1/L2) of a length L1 of a moment arm of an output applied to the connecting link 24 from the operating pedal 18 through the connecting pin 32, to a length L2 of a moment arm of an output applied to pivot member 22 from the connecting link 24 through the connecting pin 48, and accordingly changing the lever ratio characteristic such that the lever ratio is increased, as indicated by one-dot chain line or two-dot chain line in FIG. 3, to be larger than in the reference pattern. Further, the clockwise pivot motion of the control lever 44 increases an amount of the compressive deformation of the compression coil spring 46, thereby increasing the biasing force, i.e., resistance to the pivot motion of the control lever 44, so that the lever ratio is gradually increased with increase of the depression force. The change of the lever ratio characteristic is completed when the control lever 44 reaches a lever-ratio changing position in which the connecting pin 48 is brought into contact with the other of the opposite end portions of the elongated hole 50 whereby the control lever 44 is inhibited from being further pivoted. A spring constant and an amount of pre-deformation of the compression coil spring 46 are determined on the basis of the above-described predetermined value, namely, such that the coil spring 46 allows the control lever 44 to start to be pivoted away from the reference position toward the lever-ratio changing position when the depression force exceeds the predetermined value. The compression coil spring 46 can be provided by a small-sized spring having a relatively small spring force, since the engaging portion 44s is distant from the support pin 42 so that the length of the moment arm whose fulcrum corresponds to the support pin 42 is sufficiently large against the input acting on the connecting pin 48. It is noted that the other end portion of the elongated hole 50 functions as a lever-ratio change stopper which defines the lever-ratio changing position of the control lever 44.

The one-dot chain line of FIG. 3 represents a case such as the event of emergency braking in which the operating pedal 18 is depressed by a large depression force exceeding the predetermined value, from an initial stage of the depressing operation, so that the control lever 44 is pivoted to the lever-ratio changing position against the biasing force of the compression coil spring 46 in the initial stage. In this case, the lever ratio is made larger than in the reference pattern indicated by the solid line of FIG. 3, so that a large braking force is quickly generated by the quick depressing operation effected on the operating pedal 18. The broken line of FIG. 3 represents a case in which the depression force is reduced in an intermediate stage of the depressing operation, so that the control lever 44 is returned from the lever-ratio changing position to the reference position owing to the biasing force of the compression coil spring 46, whereby the lever ratio characteristic restores the reference pattern. The two-dot chain line of FIG. 3 represents a case in which a larger braking force is required in a final stage of a normal braking operation so that the operating pedal 18 is strongly depressed by a large depression force exceeding the predetermined value in the final stage, whereby the larger braking force is easily obtained as a result of the increase of the lever ratio.

Between the control lever 44 and the spring receiver 52, a positioning bolt 54 is provided to pass through the compression coil spring 46 so as to regulate a posture of the compression coil spring 46. A nut 56 is integrally fixed onto a distal end portion of the bolt 54, i.e., a portion of the bolt 54 projecting out from the engaging portion 44s of the control lever 44, such that there exists a play between the nut 56 and the control lever 44. Further, a predetermined amount of play is provided between the positioning bolt 54 and the control lever 44, or alternatively, the positioning bolt 54 is arranged to be tiltable, for allowing the control lever 44 to be pivoted about the support shaft 42 between the reference position and the lever-ratio chaining position. It is noted that the elongated hole 50 may be expanded in the above-described one of its opposite end portions so that the reference position of the control lever 44 is defined by contact of the control lever 44 with the nut 56.

Onto the connecting pins 32, 48 and support pin 42, a large load corresponding to the depression force is exerted. However, since each of the pins 32, 48, 42 is held in engagement with the operating pedal 18 or pivot member 22 through a bearing sleeve, they are given a durability sufficient for practical use.

In the brake pedal apparatus 10 of the present embodiment in which the operating pedal 18 is connected to the rod 30 through the connecting link 24 and the pivot member 22, the control lever 44 is held in the reference position as shown in FIG. 2a so that the lever ratio is changed according to the predetermined reference pattern (indicated by the solid line of FIG. 3) while the depression force is not larger than the predetermined value during a normal braking operation. When the depression force exceeds the predetermined value, the control lever 44 is pivoted against the biasing force of the compression coil spring 46, thereby shifting the connected position of the connecting pin 48 and causing the lever ratio to be larger than in the reference pattern. Thus, in the braking operation, the vehicle driver is given a feeling corresponding to a command given by the vehicle driver.

Further, in the present embodiment in which the lever ratio characteristic is changed by moving the connecting pin 48 functioning as the connected position at which the connecting link 24 and the pivot member 22 are connected to each other, the position of the connecting pin 48 is permitted to be shifted with a higher degree of freedom, than in an arrangement in which the lever ratio characteristic is changed by shifting the position of the connecting pin 28 at which the pivot member 22 is connected to the rod 30, because of absence of limitation arising from change of posture of the rod 30. Therefore, by suitably determining the positions of the support pin 42 and connecting pin 48 and the length of the elongated hole 50, it is possible to greatly change the lever ratio characteristic in accordance with a braking command (depression force) given by the vehicle driver. In the arrangement in which the posture of the rod 30 is changed, there is possibility of deterioration in durability and reliability of the apparatus, for example, due to wear which could be caused by the posture change of the rod 30.

Further, the lever-ratio characteristic changing device 40 is constructed to be equipped with the control lever 44 and the compression coil spring 46, such that the control lever 44 can be held in the reference position by a relatively small force of the coil spring 46 corresponding to the lever ratio of the control lever 44 (ratio between the length values of the moment arms). Thus, the lever-ratio characteristic changing device 40 including the compression coil spring 46 can be made compact in size at a reduced cost.

In the present embodiment, the control lever 44 is held by the biasing force of the compression coil spring 46, and is mechanically allowed to be pivoted away from the reference position against the biasing force of the compression coil spring 46 when the depression force exceeds the predetermined value. In this arrangement, the lever ratio characteristic is gradually changed owing to continuous change of the biasing force as a result of an elastic deformation of the compression coil spring 46. Further, the apparatus can be constructed easier and cheaper, eliminating necessity of a complicated control, as compared with an arrangement in which the control lever 44 is arranged to be pivoted by using an electric driving device.

Next, there will be explained other embodiments of the present invention. It is noted that the same reference numerals as used in the above-described embodiment will be used to identify the substantially similar portions, which will not be explained in detail.

Figure 4:
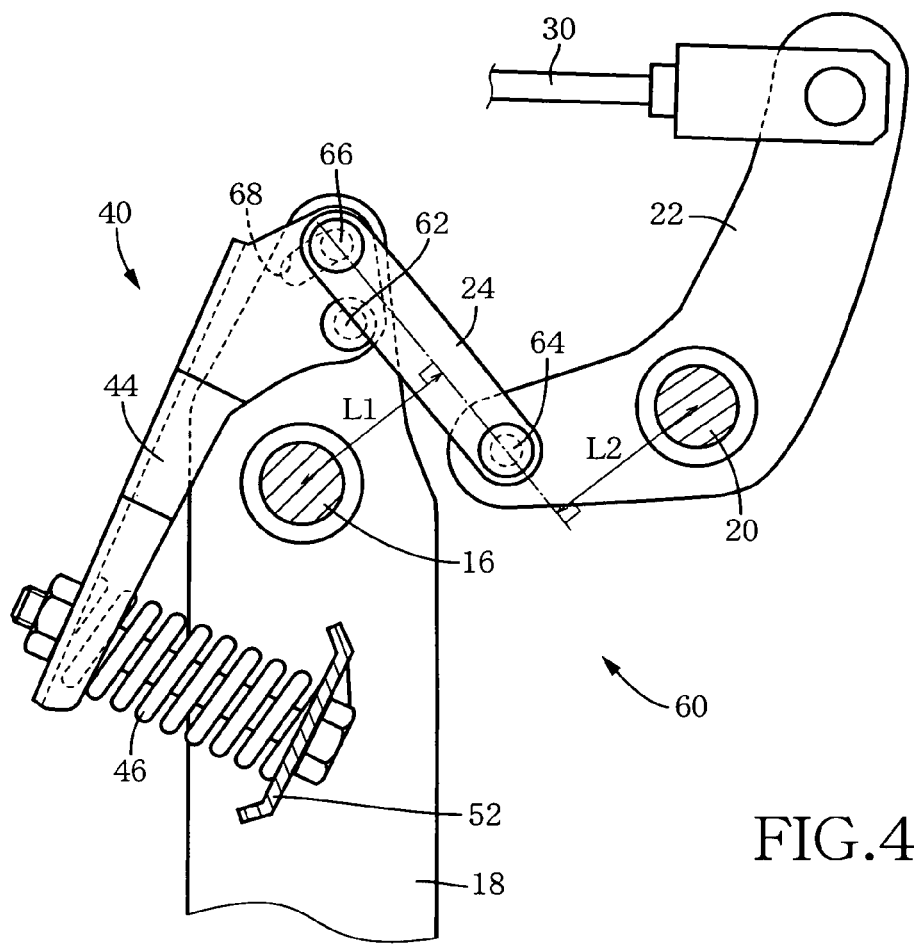
FIG. 4 is a front view corresponding to FIG. 2a and explaining another embodiment of the present invention.

A brake pedal apparatus 60 of FIG. 4 has an arrangement in which the lever-ratio characteristic changing device 40 is disposed on the operating pedal 18. In this arrangement, the operating pedal 18 corresponds to the connected-position varying ember, while the control lever 44 is connected to the operating pedal 18 through a support pin 62 which is parallel to the first support shaft 16 such that the control lever 44 and the operating pedal 18 are pivotable relative to each other about an axis of the support pin 62. The connecting link 24 is directly connected, at its connected portion closer to the pivot member 22, to the pivot member 22 through a connecting pin 64 which is parallel to the second support shaft 20. Meanwhile, the connecting link 24 is connected, at its another connected position closer to the operating pedal 18, to the control lever 44 through a connecting pin 66 which is located in vicinity of the support pin 62 and which is parallel to the support pin 62. The connecting pin 66 is arranged to pass through an elongated hole 68 which is formed through the operating pedal 18 and which extends along an arc whose center corresponds to the support pin 62.

While the control lever 44 is held in the reference position owing to the biasing force of the compression coil spring 46, as shown in FIG. 4, in which the connecting pin 66 is held in contact with one of opposite end portions of the elongated hole 68, the lever ratio is changed in accordance with the depressing operation effected on the operating pedal 18, according to the predetermined reference pattern. When the depression force exceeds the predetermined value, the compression coil spring 46 is compressed and deformed by the depressing operation effected on the operating pedal 18, whereby the control lever 44 is relatively pivoted in the counterclockwise direction about the support pin 62 from the reference position to the lever-ratio changing position, thereby causing the connecting pin 66 to moved in a direction toward the first support shaft 16 and brought into contact with the other of the opposite end portions of the elongated hole 68. In this instance, the movement of the connecting pin 66 reduces a ratio (L1/L2) of a length L1 of a moment arm of an output applied to the connecting link 24 from the operating pedal 18 through the connecting pin 66, to a length L2 of a moment arm of an output applied to the pivot member 22 from the connecting link 24 through the connecting pin 64, and accordingly changing the lever ratio characteristic such that the lever ratio is increased to be larger than in the reference pattern, as in the above-described embodiment, thereby providing the same effect as in the above-described embodiment.

Figure 5:
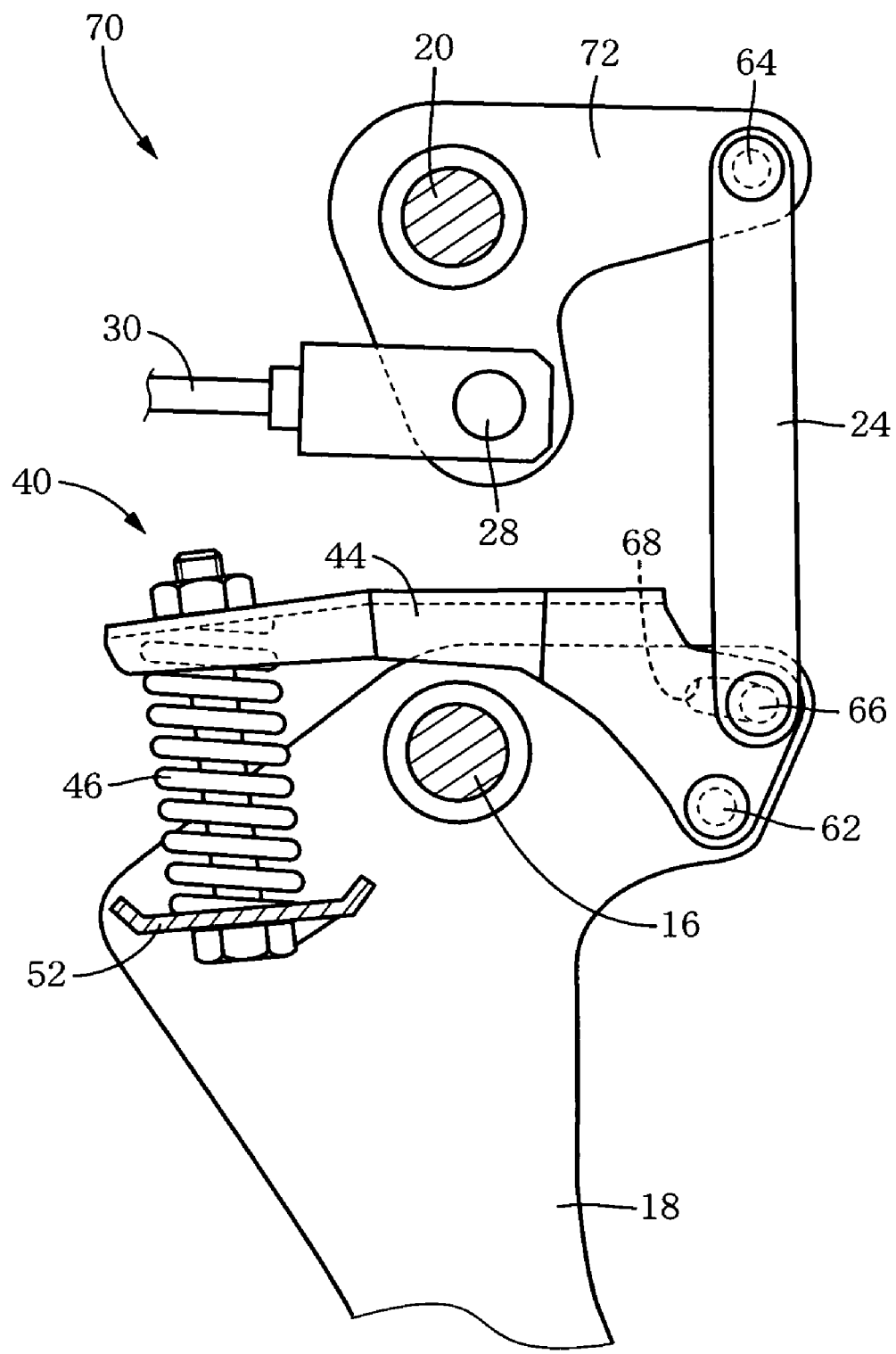
FIG. 5 is a front view corresponding to FIG. 2a and explaining still another embodiment of the present invention.

A brake pedal apparatus 70 of FIG. 5 is identical with the above-described brake pedal apparatus 60 in that the lever-ratio characteristic changing device 40 is disposed on the operating pedal 18. However, this brake pedal apparatus 70 is of pull type in which a pivot member 72 is pulled to be pivoted through the connecting link 24, in the clockwise direction about the second support shaft 20, upon the depressing operation effected on the operating pedal 18. When the depression force exceeds the predetermined value, the control lever 44 is relatively pivoted owing to a tensile force acting on the connecting link 24, in the counter-clockwise direction about the support pin 62, thereby causing the compression coil spring 46 to be compressed and deformed and accordingly shifting the position of the connecting pin 66. The positional change of the connecting pin 66 leads to change of the lever ratio characteristic and the consequent increase of the lever ratio, thereby providing the same effect as in the above-described embodiments. In this embodiment, while the control lever 44 is held in the reference position as in FIG. 5, a line segment connecting between the first support shaft 16 and the connecting pin 66 and a line segment connecting between the second support shaft 20 and the connecting pin 64 are parallel to each other and have the same length, thereby forming a parallelogram link establishing a lever ratio characteristic permitting the lever ratio to be held substantially constant irrespective of the pedal stroke, as in an arrangement in which the rod 30 is connected directly to the operating pedal 18. However, this lever ratio characteristic can be suitably changed by changing the length of the connecting link 24 and the connected position of the connecting link 24.

Figure 6:
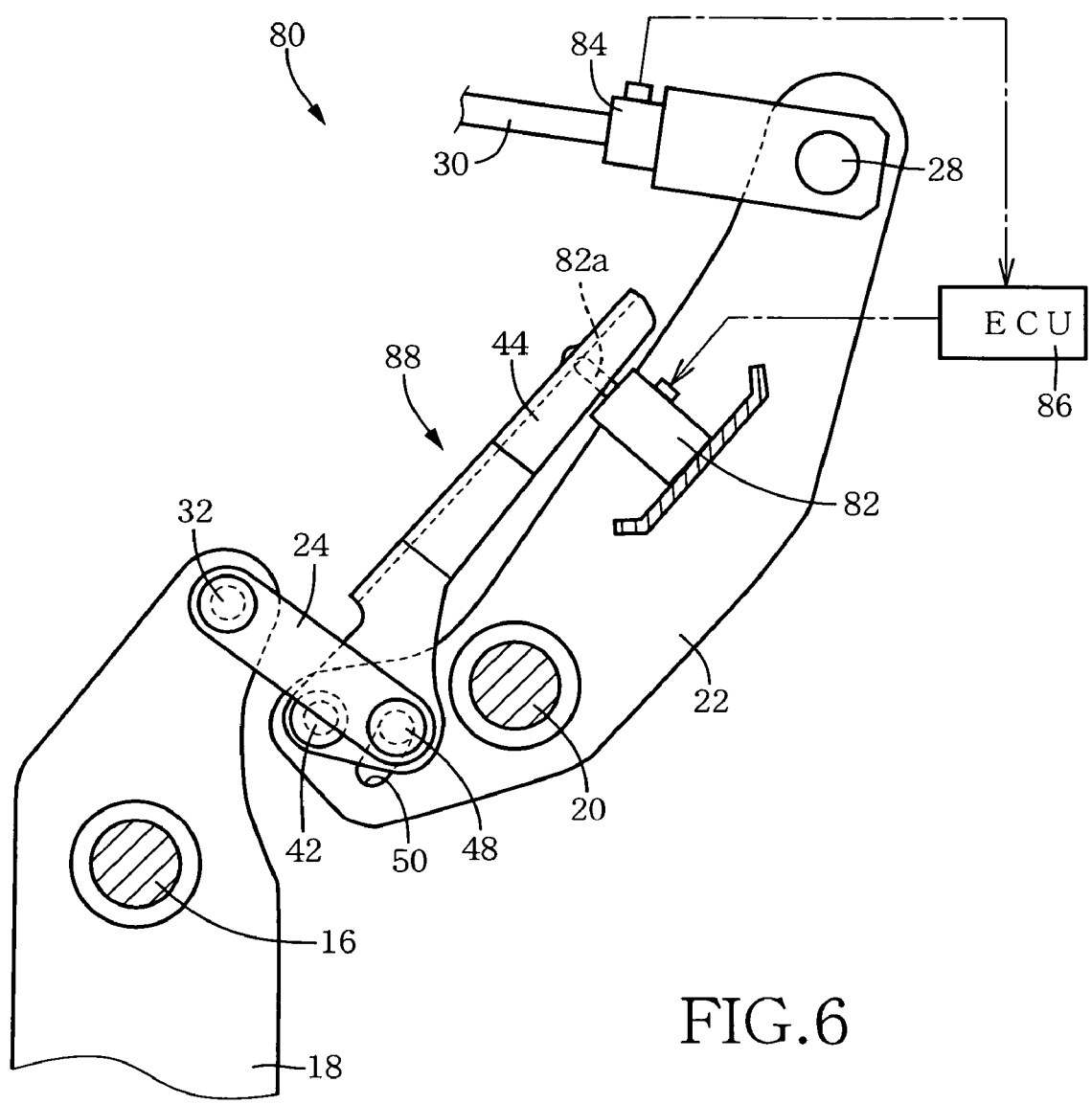
FIG. 6 is a front view corresponding to FIG. 2a and explaining still another embodiment of the present invention.

A brake pedal apparatus 80 of FIG. 6 is different from the above-described brake pedal apparatus 10 in that an electric driving device 82 is provided in place of the compression coil spring 46. Further, a load sensor 84 such as a load cell is provided in a connected portion in which the pivot member 22 and the rod 30 are connected to each other, so as to detect a transmitted load which is changed in accordance with the depression force exerted onto the operating pedal 18. An electronic control unit 86 is provided to control the electric driving device 82, on the basis of the transmitted load, for causing the control lever 44 to be pivoted about the support pin 42 and accordingly changing the lever ratio characteristic. That is, the pivoting device is constituted to include the electric driving device 82, load sensor 84 and electronic control unit 86, and cooperates with the control lever 44 to constitute a lever-ratio characteristic changing device 88. The electric driving device 82 includes an output rod 82a held in thread engagement with a nut which is rotatable in forward and reverse directions by, for example, an electric motor, so that the output rod 82a is caused to project and retract.

The electronic control unit 86, when the transmitted load detected by the load sensor 84 is not larger than a threshold corresponding to the above-described predetermined value, causes the output rod 82a of the electric driving device 82 to project so as to pivot the control lever 44 counterclockwise about the support pin 42, whereby the control lever 44 is positioned and held in the reference position in which the connecting pin 48 is in contact with one of opposite end portions of the elongated hole 50. Threads formed in the output rod 82a and the nut have dimensions, which are designed to mechanically inhibits movement of the output rod 82a while an electric power supply to the electric driving device 82 is being turned OFF. That is, while the transmitted load is not larger than the threshold, the control lever 44 is held in the reference position, irrespective of the braking operation, whereby the layer ratio is changed according to the reference pattern indicated by the solid line of FIG. 3. On the other hand, when the transmitted load exceeds the above-described threshold, the output rod 82a of the electric driving device 82 is caused to retract, whereby the control lever 44 is pivoted owing to the depression force exerted onto the operating pedal 18, in the clockwise direction about the support pin 42, so as to be held in the lever-ratio changing position in which the connecting pin 48 is in contact with the other of the opposite end portions of the elongated hole 50, thereby changing the lever ratio characteristic such that the lever ratio is increased, as indicated by the one-dot chain line or two-dot chain line in FIG. 3, to be larger than in the reference pattern. In the present embodiment, the output rod 82a is merely held in contact with the engaging portion 44s of the control lever 44. However, the output rod 82a may be connected to the engaging portion 44s, so that the control lever 44 is pivotable by the electric driving device 82.

As described above, in the present embodiment, the control lever 44 is pivoted about the axis of the support pin 42 by the electric driving device 82, whereby the lever ratio characteristic is changed in accordance with the depression force as in the first embodiment, so that the same effect is provided as in the first embodiment. In addition, since the electric driving device 82 is used for causing the control lever 44 to electrically pivoted, it is easy to determine a value (predetermined value) of the depression force at which the lever ratio characteristic is to be changed, thereby permitting the value to be freely determined depending upon, for example, type of vehicle.

Further, in the present embodiment, the lever ratio characteristic may be changed in a single step, by pivoting the control lever 44 when the depression force reaches the predetermined value, or alternatively may be changed gradually or in a plurality of steps in accordance with the depression force. That is, it is possible to freely determine a changing manner according to which the lever ratio characteristic is to be changed. Further, it is also possible to select a suitable mode according to which the predetermined value and the changing manner are to be changed, in relation to a vehicle condition, namely, depending upon whether snow mode is being selected or not, whether emergency braking is being carried out or not, whether road surface is being frozen or not, or whether it is raining or not. Further, the lever ratio characteristic may be changed by pivoting the control lever 44 in accordance with the pedal stroke in addition to or in place of the depression force.

The embodiments of the present invention have been explained in detail with reference to the drawings. However, the explained embodiments are merely embodied forms, and the present invention can be embodied with various modifications and improvements on the basis of knowledge of those skilled in the art.

The invention claimed is:

1. A brake pedal apparatus comprising:
  (a) an operating pedal which is to be depressed so as to be pivoted about a first axis;
  (b) a pivot member which pivots about a second axis parallel to the first axis;
  (c) a connecting link connected at a first connected position to the operating pedal and at a second connected position to the pivot member respectively such that the pivot member is pivoted about the second axis in response to a depression of the operating pedal via pivot motion of the connecting link, and the first connected position shifts relative to the operating pedal or the second connected position shifts relative to the pivot member; and
  (d) an output member which receives an output generated upon pivot motion of the pivot member;
  a relationship between a ratio of the output to a depression force acting on the operating pedal, and an amount of the depression of the operating pedal is configured to be changed depending upon shifting of one of the first and second connected positions of the connecting link;
  the brake pedal apparatus further comprising:
  (e) a ratio characteristic changing device which operates when the depression force exceeds a predetermined value, to shift the one of the first and second connected positions of the connecting link, for thereby changing the relationship between the ratio and the amount of the depression of the operating pedal
  the ratio characteristic changing device including:

(e-1) a control lever which is connected to the connecting link, and which is connected to one of the operating pedal and the pivot member at a third axis parallel to the first axis pivotably thereabout, such that the one of the first and second connected positions is shifted by pivot motion of the control lever, for thereby changing the relationship between the ratio and the amount of the depression of the operating pedal; and (e-2) a pivoting device which bridges between the one of the operating pedal and the pivot member and an engaging portion of the control lever that is distant from the one of the first and second connected positions by a distance larger than a distance between the one of the first and second connected positions and the third axis, and which holds the control lever at a reference position when the depression force does not exceed the predetermined value, and causes the control lever to be pivoted away from the reference position so as to shift the one of the first and second connected positions when the depression force exceeds the predetermined value.

2. The brake pedal apparatus according to claim 1, wherein the output member receives one of a pressing force and a tensile force as the output generated upon the pivot motion of the pivot member.

3. The brake pedal apparatus according to claim 1, wherein the ratio characteristic changing device is operated when the depression force exceeds the predetermined value, shifts the one of the first and second connected positions of the connecting link such that the ratio of the output to the depression force is increased.

4. The brake pedal apparatus according to claim 1, wherein the pivoting device includes:

(e-2-1) a load sensor which is disposed in a transmission path along which the depression force is to be transmitted, so as to detect a transmitted load; and (e-2-2) an electric driving device which is connected to the engaging portion of the control lever, and which holds the control lever at the reference position when the transmitted load does not exceed a threshold corresponding to the predetermined value, and causes the control lever to be pivoted about the third ads when the transmitted load exceeds the threshold.

5. The brake pedal apparatus according to claim 1, wherein the pivoting device includes a biaser which biases the control lever in a first direction causing the control lever to be forced against a reference stopper defining the reference position, and which allows the control lever to be pivoted based on the depression force, away from the reference position in a direction opposite to the first direction when the depression force exceeds the predetermined value.

6. The brake pedal apparatus according to claim 1, wherein the connecting link is connected to the pivot member via the control lever, and the second connected position corresponds to position of a pin connecting the connecting link to the pivot member and is shifted in an elongated hole formed in the pivot member by the pivot motion of the control lever.

7. The brake pedal apparatus according to claim 1, wherein the connecting link is connected to the operating pedal via the control lever, and the first connected position corresponds to a position of a pin connecting the connecting link to the operating pedal and is shifted in an elongated hold formed in the operating pedal by the pivot motion of the control lever.

\* \* \* \* \*

UNITED STATES PATENT AND TRADEMARK OFFICE
CERTIFICATE OF CORRECTION

PATENT NO. : 7,614,320 B2
APPLICATION NO. : 11/120282
DATED : November 10, 2009
INVENTOR(S) : Akihiko Fukase It is certified that error appears in the above-identified patent and that said Letters Patent is hereby corrected as shown below:

Claim 4, col. 14, line 9 "ads" should read --axis--.

Claim 7, col. 14, line 29, "hold" should read --hole--.

Signed and Sealed this

Sixteenth Day of February, 2010

David J. Kappos
*Director of the United States Patent and Trademark Office*